United States Patent
Hirayama et al.

(10) Patent No.: US 9,963,541 B2
(45) Date of Patent: May 8, 2018

(54) PHOTOSENSITIVE RESIN COMPOSITION FOR OPTICAL WAVEGUIDE, PHOTOCURABLE FILM FOR FORMATION OF OPTICAL WAVEGUIDE CORE LAYER, OPTICAL WAVEGUIDE PRODUCED BY USING THE RESIN COMPOSITION OR THE PHOTOCURABLE FILM, AND HYBRID FLEXIBLE PRINTED WIRING BOARD FOR OPTICAL/ELECTRICAL TRANSMISSION

(71) Applicant: NITTO DENKO CORPORATION, Ibaraki-shi, Osaka (JP)

(72) Inventors: Tomoyuki Hirayama, Ibaraki (JP); Naoya Sugimoto, Ibaraki (JP)

(73) Assignee: NITTO DENKO CORPORATION, Osaka (JP)

(*) Notice: Subject to any disclaimer, the term of this patent is extended or adjusted under 35 U.S.C. 154(b) by 0 days. days.

(21) Appl. No.: 15/108,804

(22) PCT Filed: Jan. 27, 2015

(86) PCT No.: PCT/JP2015/052106
§ 371 (c)(1),
(2) Date: Jun. 29, 2016

(87) PCT Pub. No.: WO2015/118989
PCT Pub. Date: Aug. 13, 2015

(65) Prior Publication Data
US 2016/0326298 A1    Nov. 10, 2016

(30) Foreign Application Priority Data

Feb. 10, 2014 (JP) ................... 2014-023193

(51) Int. Cl.
| | |
|---|---|
| *G02B 6/12* | (2006.01) |
| *G02B 6/138* | (2006.01) |
| *C08G 59/32* | (2006.01) |
| *C08G 59/38* | (2006.01) |
| *C09D 163/00* | (2006.01) |
| *C09D 171/00* | (2006.01) |
| *G02B 6/10* | (2006.01) |
| *C08L 63/00* | (2006.01) |
| *C08G 59/40* | (2006.01) |
| *C08G 65/22* | (2006.01) |
| *G02B 6/122* | (2006.01) |
| *C08G 59/24* | (2006.01) |
| *C08G 59/68* | (2006.01) |
| *C08G 65/18* | (2006.01) |

(52) U.S. Cl.
CPC ......... *C08G 59/3218* (2013.01); *C08G 59/24* (2013.01); *C08G 59/38* (2013.01); *C08G 59/4007* (2013.01); *C08G 59/687* (2013.01); *C08G 65/18* (2013.01); *C08G 65/22* (2013.01); *C08L 63/00* (2013.01); *C09D 163/00* (2013.01); *C09D 171/00* (2013.01); *G02B 6/10* (2013.01); *G02B 6/12* (2013.01); *G02B 6/1221* (2013.01); *G02B 6/138* (2013.01); *G02B 2006/1219* (2013.01)

(58) Field of Classification Search
None
See application file for complete search history.

(56) References Cited

U.S. PATENT DOCUMENTS

| | | |
|---|---|---|
| 2008/0035572 A1 | 2/2008 | Sabottke et al. |
| 2012/0033913 A1 | 2/2012 | Kondou et al. |
| 2014/0017126 A1 | 1/2014 | Kontani |

FOREIGN PATENT DOCUMENTS

| | | | |
|---|---|---|---|
| JP | 6-281831 A | 10/1994 | |
| JP | 2006-22317 A | 1/2006 | |
| JP | 2009-37007 A | 2/2009 | |
| JP | 2010-230944 A | 10/2010 | |
| JP | 2011-52225 A | 3/2011 | |
| JP | 2012-215541 A | 11/2012 | |
| WO | WO 2010110495 A1 * | 9/2010 | ........... C08G 59/226 |

OTHER PUBLICATIONS

Notification of Transmittal of Translation of the International Preliminary Report on Patentability (Form PCT/IB/338) issued in counterpart International Application No. PCT/JP2015/052106 dated Aug. 25, 2016, with Forms PCT/IB/373 and PCT/ISA/237. (7 pages).
International Search Report dated Mar. 17, 2015, issued in counterpart international application No. PCT/JP2015/052106 (1page).
Office Action dated Nov. 21, 2017, issued in counterpart Japanese Application No. 2014-023193, with English achine translation. (10 pages).

* cited by examiner

*Primary Examiner* — Michelle R Connelly
(74) *Attorney, Agent, or Firm* — Westerman, Hattori, Daniels & Adrian, LLP

(57) ABSTRACT

According to the present invention, a photosensitive resin composition for an optical waveguide contains a resin component and a photopolymerization initiator. The resin component has an absorbance of less than 0.03 as measured at 2960 cm$^{-1}$ by an attenuated total reflection measurement (ATR) method by means of a Fourier transform infrared spectrophotometer (FT-IR), and includes a polymerizable substituent-containing resin as a main component. Where the inventive optical waveguide photosensitive resin composition is used as a material for the optical waveguide, particularly as a core layer formation material for the optical waveguide, it is possible to reduce a loss, for example, by avoiding vibrational absorption occurring at an optical waveguide transmission light wavelength of 850 nm due to a resin skeleton.

13 Claims, No Drawings

PHOTOSENSITIVE RESIN COMPOSITION FOR OPTICAL WAVEGUIDE, PHOTOCURABLE FILM FOR FORMATION OF OPTICAL WAVEGUIDE CORE LAYER, OPTICAL WAVEGUIDE PRODUCED BY USING THE RESIN COMPOSITION OR THE PHOTOCURABLE FILM, AND HYBRID FLEXIBLE PRINTED WIRING BOARD FOR OPTICAL/ELECTRICAL TRANSMISSION

TECHNICAL FIELD

The present invention relates to an optical waveguide photosensitive resin composition and an optical waveguide core layer formation photocurable film to be used as a material for formation of a core layer or the like of an optical waveguide in an optical/electrical transmission hybrid flexible printed wiring board which is widely used for optical communications, optical information processing and other general optics. The invention further relates to an optical waveguide produced by using the resin composition or the photocurable film, and to a hybrid flexible printed wiring board for optical/electrical transmission.

BACKGROUND ART

In designing an optical waveguide core layer formation material for a hybrid flexible printed wiring board for optical/electrical transmission, for example, a cured product of the core layer formation material is required to have a higher refractive index than a cured product of a cladding layer formation material. Therefore, it is conventionally a general practice to use a highly aromatic resin component in the design of the formulation of the core layer formation material. For reduction of an optical loss at a wavelength of 850 nm, for example, the absorption peak of the optical waveguide core layer formation material should be substantially prevented from broadening to a wavelength of 850 nm from the short wavelength range. For this major purpose, it is a general practice in the design of the formulation to improve the transparency of the core layer formation material based on the purity of a resin component of the formation material, or to reduce the amount of a photopolymerization initiator to be used particularly for a photocurable resin material (PTL 1 and PTL 2).

RELATED ART DOCUMENT

Patent Document

PTL 1: JP-A-2010-230944
PTL 2: JP-A-2011-52225

SUMMARY OF INVENTION

Where a core layer formation material containing an aromatic resin skeleton is used for an optical waveguide having a transmission light wavelength of 850 nm, however, the peak of fourth harmonic absorption (aromatic $4v_{CH}$) attributable to the vibrational absorption of a C—H bond of an aromatic ring is liable to broaden to 850 nm. Therefore, the loss reduction has a limitation even if the material has sufficient transparency. An optical waveguide intended for long-distance transmission requires further loss reduction. That is, it is desirable to reduce the loss by avoiding the vibrational absorption occurring at an optical waveguide transmission light wavelength of 850 nm due to the resin skeleton.

In view of the foregoing, it is an object of the present invention to provide an optical waveguide photosensitive resin composition and an optical waveguide core layer formation photocurable film which permit the loss reduction, and to provide an optical waveguide produced by using the resin composition or the photocurable film and a hybrid flexible printed wiring board for optical/electrical transmission.

According to a first aspect of the present invention to achieve the object described above, there is provided a photosensitive resin composition for an optical waveguide, the photosensitive resin composition containing a resin component and a photopolymerization initiator, wherein the resin component has an absorbance of less than 0.03 as measured at 2960 cm$^{-1}$ by an attenuated total reflection measurement (ATR) method by means of a Fourier transform infrared spectrophotometer (FT-IR), wherein the resin component includes a polymerizable substituent-containing resin as a main component.

According to a second aspect of the present invention, there is provided a photocurable film for formation of an optical waveguide core layer, the photocurable film being produced by forming the optical waveguide photosensitive resin composition of the first aspect into a film shape.

According to a third aspect of the present invention, there is provided an optical waveguide, which includes a substrate, a cladding layer provided on the substrate, and a core layer provided in a predetermined pattern in the cladding layer for transmission of an optical signal, wherein the core layer is formed by curing the optical waveguide photosensitive resin composition of the first aspect or the optical waveguide core layer formation photocurable film of the second aspect.

According to a fourth aspect of the present invention, there is provided a hybrid flexible printed wiring board for optical/electrical transmission, the hybrid flexible printed wiring board including the optical waveguide of the third aspect.

The inventors of the present invention conducted intensive studies to provide a photosensitive resin composition that is highly transparent and permits sufficient loss reduction for use as a core layer formation material for an optical waveguide. As a result, the inventors found that, where a resin component of the resin composition has a lower absorbance in a C—H bond vibrational absorption band of 3000 to 2800 cm$^{-1}$, particularly at 2960 cm$^{-1}$, in its infrared spectrum and includes a photopolymerizable substituent-containing resin as a main component, it is possible to avoid the vibrational absorption occurring at an optical waveguide transmission light wavelength of 850 nm due to the resin skeleton, thereby achieving the loss reduction. Thus, the inventors attained the present invention.

By using the resin component having a lower absorbance as measured at 2960 cm$^{-1}$ by the FT-IR ATR method and including the polymerizable substituent-containing resin as the major component, the aforementioned object is achieved for the following reason. The loss attributable to the C—H bond vibrational absorption occurring at an optical waveguide transmission light wavelength of 850 nm is generally avoided by using a resin having an aliphatic skeleton structure instead of the resin having the aromatic skeleton structure. Where vibrational absorption bands for C—H bonds in various structures are associated with an absorption loss at 850 nm, consideration should be given to stretch vibrations of C—H bonds in unsaturated aliphatic structures as well as C—H bonds in saturated aliphatic structures including a primary carbon, a secondary carbon, a tertiary carbon and the like. As a result of extensive studies, the inventors of the present invention found that the stretch vibrations of these C—H bonds cause peak shift in respective ambient environments, but the absorption loss at 850 nm is influenced by an absorbance occurring at 2960 $cm^{-1}$ due to these C—H bonds. In the present invention, therefore, the resin having an absorbance of less than 0.03 as measured at 2960 $cm^{-1}$ by the FT-IR ATR method is selected for use as the resin component, thereby making it possible to reduce the absorption loss at 850 nm in the conventional optical waveguide.

The photosensitive resin composition for the optical waveguide according to the present invention contains the resin component having an absorbance of less than 0.03 as measured at 2960 $cm^{-1}$ by the FT-IR ATR method and including the polymerizable substituent-containing resin as the main component, and the photopolymerization initiator. Where the optical waveguide photosensitive resin composition is used for formation of a core layer of the optical waveguide, for example, it is possible to avoid the vibrational absorption occurring at an optical waveguide transmission light wavelength of 850 nm due to the resin skeleton, thereby achieving the loss reduction.

DESCRIPTION OF EMBODIMENTS

Next, an embodiment of the present invention will be described in detail. However, it should be understood that the present invention be not limited to this embodiment.

<<Photosensitive Resin Composition for Optical Waveguide>>

An inventive photosensitive resin composition for an optical waveguide (hereinafter sometimes referred to simply as "photosensitive resin composition") is obtained by using a specific resin component having an absorbance of less than 0.03 as measured at 2960 $cm^{-1}$ by the ATR (Attenuated Total Reflection) method by means of the FT-IR (Fourier transform infrared spectrophotometer) and including, as a main component, a resin containing a polymerizable substituent, and a photopolymerization initiator. In the ATR method, light totally reflected on a surface of a specimen to be subjected to the measurement is analyzed to provide an absorption spectrum of the surface of the specimen. The present invention has a feature such that the resin component includes the polymerizable substituent-containing resin as the main component, and has an absorbance of less than 0.03 as measured at 2960 $cm^{-1}$ by the FT-IR ATR method. In the present invention, the term "main component" means not only that the resin component contains the polymerizable substituent-containing resin alone but also that the resin component may further contain a resin containing no polymerizable substituent (e.g., an aliphatic resin functioning as a binder resin) as long as the effects of the invention are not impaired. The latter case means that the polymerizable substituent-containing resin as the main component is present in a proportion of not less than 50 wt % based on the weight of the overall resin component. In the present invention, the term "liquid" or "solid" means that a substance is in a liquid state or in a solid state at a temperature of 25° C.

<Polymerizable Substituent-Containing Resin>

Examples of the polymerizable substituent-containing resin which is the major component of the resin component and imparts the resin component with an absorbance of less than 0.03 as measured at 2960 $cm^{-1}$ by the FT-IR ATR method include polyfunctional aliphatic epoxy resins such as a 1,2-epoxy-4-(2-oxiranyl)cyclohexane adduct of 2,2-bis (hydroxymethyl)-1-butanol, and aliphatic epoxy resins such as 3',4'-epoxycyclohexylmethyl-3,4-epoxycyclohexane carboxylate. Examples of the resin functioning as the binder resin include a hydrogenated bisphenol-A epoxy resin and a hydrogenated bisphenol-F epoxy resin that have no aromatic ring. These resins may be used alone or in combination. In consideration of the absorbance, it is particularly preferred to use a 1,2-epoxy-4-(2-oxiranyl)cyclohexane adduct of 2,2-bis(hydroxymethyl)-1-butanol alone, or to use a 1,2-epoxy-4-(2-oxiranyl)cyclohexane adduct of 2,2-bis(hydroxymethyl)-1-butanol in combination with at least one of a solid hydrogenated bisphenol-A epoxy resin, a liquid hydrogenated bisphenol-A epoxy resin, a polytetramethylene glycol diglycidyl ether, a trimethylolpropane polyglycidyl ether and 3-ethyl-3{[(3-ethyloxetan-3-yl)methoxy]methyl}oxetane. For the combinational use, the proportion of the 1,2-epoxy-4-(2-oxiranyl)cyclohexane adduct of 2,2-bis(hydroxymethyl)-1-butanol is preferably set to not less than 50 wt %, particularly preferably not less than 70 wt %, based on the weight of the overall resin component.

Specific examples of the polymerizable substituent-containing resin include EHPE 3150 and EHPE 3150CE (available from Daicel Corporation), YX-8040, YX-8000 and YX-8034 (available from Mitsubishi Chemical Corporation), EP-4080E (available from ADEKA Corporation), EPOGOSE PT (available from Yokkaichi Chemical Co., Ltd.), DENACOL EX-321 (available from Nagase ChemteX Corporation) and ARONOXETANE OXT-221 (available from Toagosei Co., Ltd.) In the present invention, the aliphatic epoxy resins are intended to include alicyclic epoxy resins. The aliphatic epoxy resins are preferably solid. In this case, the term "solid" means that the aliphatic epoxy resins are in a solid state at room temperature (25° C.).

Examples of the polymerizable substituent of the polymerizable substituent-containing resin include an epoxy group, an epoxy group having an alicyclic skeleton, and a substituent having an oxetane skeleton, among which the epoxy groups are preferred.

In the present invention, the resin component including the polymerizable substituent-containing resin as the main component (essential component) is required to have an absorbance of less than 0.03, more preferably not greater than 0.02, particularly preferably not greater than 0.015, as measured at 2960 $cm^{-1}$ by the FT-IR ATR method. If the absorbance is excessively high, it will be impossible to reduce the loss as desired.

The absorbance is measured at 2960 $cm^{-1}$ by the FT-IR ATR method in the following manner. First, a varnish containing the resin component (including the polymerizable substituent-containing resin as the main component) alone is prepared without addition of a photoacid generator and an antioxidant (as required, with the use of an organic solvent). Subsequently, the varnish is applied onto a substrate, and then heated to be prebaked under predetermined conditions (e.g., at 110° C. to 140° C. for about 2 to about 10 minutes), whereby an uncured thin film is formed (in a film shape). The absorbance of the resulting film-shaped uncured thin film is measured at 2960 $cm^{-1}$ by the FT-IR ATR method. It is noted that the absorbance at 2960 $cm^{-1}$ is calculated based on a base line defined in a spectral band between 3100 $cm^{-1}$ and 2600 $cm^{-1}$.

<Photopolymerization Initiator>

The photopolymerization initiator is used for imparting the photosensitive resin composition with radiation curability, e.g., ultraviolet curability.

A photoacid generator is preferably used as the photopolymerization initiator. Examples of the photoacid generator include photoacid generators (photo-cationic curing initiators) such as benzoins, benzoin alkyl ethers, acetophenones, aminoacetophenones, anthraquinones, thioxanthones, ketals, benzophenones, xanthones and phosphine oxides. Specific examples of the photoacid generators include triphenylsulfonium hexafluoroantimonate, 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propane, 2-hydroxy-1-(4-[4-(2-hydroxy-2-methylpropionyl)benzyl]phenyl)-2-methylpropan-1-one, 2-benzyl-2-dimethylamino-1-(4-morpholinophenyl)-butanone-1,2-methyl-1-(4-methylthiophenyl)-2-morpholinopropan-1-one, bis(2,4,6-trimethylbenzoyl)-phenylphosphine oxide, 2,4,6-trimethylbenzoyl-diphenylphosphine oxide, bis($\eta$5-2,4-cyclopentadien-1-yl)-bis[2,6-difluoro-3-(1H-pyrrol-1-yl)phenyl]titanium and 2-hydroxy-1-{4-[4-(2-hydroxy-2-methylpropionyl)benzyl] phenyl}-2-methylpropan-1-one. These may be used alone or in combination. Of these, triphenylsulfonium hexafluoroantimonate, 2,2-dimethoxy-1,2-diphenylethan-1-one, 1-hydroxycyclohexyl phenyl ketone and 2-hydroxy-1-{4-[4-(2-hydroxy-2-methylpropionyl)benzyl] phenyl}-2-methylpropan-1-one are preferably used from the viewpoints of a higher curing rate and thicker film curability.

The proportion of the photopolymerization initiator is set to 0.1 to 3 parts by weight, more preferably 0.1 to 1 part by weight, based on 100 parts by weight of the resin component (including the photopolymerizable substituent-containing resin as the main component) of the photosensitive resin composition. If the proportion of the photopolymerization initiator is excessively small, it will be difficult to impart the photosensitive resin composition with satisfactory photocurability effected by irradiation with light (irradiation with ultraviolet radiation). If the proportion of the photopolymerization initiator is excessively great, the photosensitive resin composition tends to have higher photosensitivity to result in an abnormal shape in patterning, and to be poorer in required physical properties associated with an initial loss.

As required, the inventive photosensitive resin composition may contain additives in addition to the polymerizable substituent-containing resin as the resin component and the photopolymerization initiator. Examples of the additives include adhesiveness imparting agents, such as silane-based and titanium-based coupling agents, olefin oligomers, cycloolefin oligomers and polymers (e.g., norbornene polymers and the like), synthetic rubbers and silicone compounds, for enhancing the adhesiveness, various antioxidants such as a hindered phenol antioxidant and a phosphorus antioxidant, a leveling agent and a defoaming agent. These additives may be properly blended as long as the effects of the present invention are not impaired. These additives may be used alone or in combination.

The proportion of the antioxidant is preferably set to less than 3 parts by weight, particularly preferably 0.5 to 1 part by weight, based on 100 parts by weight of the resin component (including the photopolymerizable substituent-containing resin as the main component) of the photosensitive resin composition. If the proportion of the antioxidant is excessively great, the photosensitive resin composition tends to be poorer in required physical properties associated with the initial loss.

The inventive photosensitive resin composition can be prepared by mixing the resin component including the polymerizable substituent-containing resin as the main component, the photopolymerization initiator and, as required, any of the other additives in predetermined proportions with stirring. Where the inventive photosensitive resin composition is prepared in the form of a coating varnish, the resulting mixture may be dissolved in an organic solvent with heating (e.g., at about 60° C. to about 90° C.) and stirring. The amount of the organic solvent to be used may be properly adjusted, but preferably set to, for example, 10 to 80 parts by weight, particularly preferably 10 to 40 parts by weight, based on 100 parts by weight of the resin component (including the photopolymerizable substituent-containing resin as the main component) of the photosensitive resin composition. If the amount of the organic solvent to be used is excessively small, the prepared coating varnish tends to have a higher viscosity and hence poorer coatability. If the amount of the organic solvent to be used is excessively great, it will be difficult to form a thicker coating film with the use of the coating varnish.

Examples of the organic solvent to be used for the preparation of the coating varnish include ethyl lactate, methyl ethyl ketone, cyclohexanone, 2-butanone, N,N-dimethylacetamide, diglyme, diethylene glycol methyl ethyl ether, propylene glycol methyl acetate, propylene glycol monomethyl ether, tetramethylfurane and dimethoxyethane. These organic solvents may be used alone or in combination in a proper amount, for example, within the aforementioned range so as to impart the varnish with a viscosity suitable for the coating.

<<Optical Waveguide>>

Next, an optical waveguide will be described, which is produced by using the inventive photosensitive resin composition as a core layer formation material.

An optical waveguide according to the present invention includes, for example, a substrate, a cladding layer (under-cladding layer) provided in a predetermined pattern on the substrate, a core layer provided in a predetermined pattern on the cladding layer for transmitting an optical signal, and another cladding layer (over-cladding layer) provided over the core layer. The optical waveguide according to the present invention has a feature such that the core layer is formed from the aforementioned photosensitive resin composition. Cladding layer formation resin compositions having the same formulation or different formulations may be used as an under-cladding layer formation material and an over-cladding layer formation material. In the optical waveguide according to the present invention, the cladding layers are required to have a lower refractive index than the core layer.

In the present invention, the optical waveguide is produced, for example, through the following process steps. A substrate is prepared, and a photosensitive varnish of a photosensitive resin composition as the cladding layer formation material is applied onto the substrate. The applied photosensitive varnish is cured by irradiating a varnish-applied surface with light such as ultraviolet radiation and, as required, heat-treating the photosensitive varnish. Thus, an under-cladding layer (lower cladding layer portion) is formed.

Then, a core layer formation material (photosensitive varnish) prepared by dissolving the inventive photosensitive resin composition in the organic solvent is applied onto the under-cladding layer to form an uncured core formation layer. After the application of the core layer formation material (photosensitive varnish), the organic solvent is dried off with heating. Thus, an uncured photocurable film for formation of the optical waveguide core layer is formed in a film shape. In turn, a photomask having a predetermined pattern (optical waveguide pattern) for light exposure is put on a surface of the uncured core formation layer. Then, the core formation layer is irradiated with light such as ultraviolet radiation via the photomask and, as required, heat-treated. Thereafter, an unexposed portion of the uncured core formation layer is dissolved away with the use of a developing liquid, whereby a core layer is formed as having the predetermined pattern.

Subsequently, a photosensitive varnish of the photosensitive resin composition as the cladding layer formation material is applied over the core layer. Then, the cladding layer formation material is irradiated with light such as ultraviolet radiation and, as required, heat-treated, whereby an over-cladding layer (upper cladding layer portion) is formed. Thus, the intended optical waveguide is produced through these process steps.

Exemplary materials for the substrate include a silicon wafer, a metal substrate, a polymer film and a glass substrate. Examples of the metal substrate include stainless steel plates such as of JIS SUS. Specific examples of the polymer film include polyethylene terephthalate (PET) films, polyethylene naphthalate films and polyimide films. The substrate typically has a thickness of 10 μm to 3 mm.

Specifically, the light irradiation may be irradiation with ultraviolet radiation. Exemplary ultraviolet light sources for the irradiation with the ultraviolet radiation include a low pressure mercury lamp, a high pressure mercury lamp and an ultrahigh pressure mercury lamp. The dose of the ultraviolet radiation is typically about 10 to about 20000 $mJ/cm^2$, preferably about 100 to about 15000 $mJ/cm^2$, more preferably about 500 to about 10000 $mJ/cm^2$.

After the light exposure by the irradiation with the ultraviolet radiation, the heat treatment may be further performed to complete a photoreaction for the curing. Conditions for the heat treatment are typically a temperature of 80° C. to 250° C. and a period of 10 seconds to 2 hours, preferably a temperature of 100° C. to 150° C. and a period of 5 minutes to 1 hour.

The cladding layer formation material is, for example, a resin composition containing any of various liquid epoxy resins and solid epoxy resins such as bisphenol-A epoxy resins, bisphenol-F epoxy resins, hydrogenated bisphenol-A epoxy resins, fluorinated epoxy resins and epoxy-modified silicone resins, and any of the aforementioned photoacid generators. The formulation of the cladding layer formation material is properly designed so that the cladding layer formation material has a lower refractive index than the core layer formation material. For preparation of the cladding layer formation material to be applied in the form of a varnish, as required, any of conventionally known various organic solvents may be used in a proper amount so as to impart the varnish with a viscosity suitable for the application of the varnish, and various additives (an antioxidant, an adhesiveness imparting agent, a leveling agent and a UV absorbing agent) may be used in proper amounts as long as the functions of the optical waveguide produced by using the core layer formation material are not impaired.

Examples of the organic solvent to be used for the preparation of the varnish include ethyl lactate, methyl ethyl ketone, cyclohexanone, 2-butanone, N,N-dimethylacetamide, diglyme, diethylene glycol methyl ethyl ether, propylene glycol methyl acetate, propylene glycol monomethyl ether, tetramethylfurane and dimethoxyethane as in the aforementioned case. These organic solvents may be used alone or in combination in a proper amount so as to impart the varnish with a viscosity suitable for the application of the varnish.

Exemplary methods for the application of the formation materials for the respective layers on the substrate include coating methods employing a spin coater, a coater, a spiral coater, a bar coater or the like, a screen printing method, a capillary injection method in which the material is injected into a gap formed with the use of spacers by the capillary phenomenon, and a continuous roll-to-roll coating method employing a coating machine such as a multi-coater. The optical waveguide may be provided in the form of a film optical waveguide by removing the substrate.

The optical waveguide thus produced may be used as an optical waveguide, for example, for a hybrid flexible printed wiring board for optical/electrical transmission.

EXAMPLES

Next, the present invention will be described by way of examples thereof. However, it should be understood that the present invention be not limited to these examples. In the examples, the term "part(s)" means "part(s) by weight" unless otherwise specified.

Example 1

A photosensitive varnish as a core layer formation material was prepared in the following manner.

<Preparation of Core Layer Formation Material>

Under shaded conditions, 100 parts of a solid polyfunctional aliphatic epoxy resin (EHPE 3150 available from Daicel Corporation), 1 part of a photoacid generator (WPI-116 available from Wako Pure Chemical Industries, Ltd.), 0.5 parts of a hindered phenol antioxidant (Songnox 1010 available from Kyodo Chemical Co., Ltd.) and 0.5 parts of a phosphorus antioxidant (HCA available from Sanko Co., Ltd.) were mixed with and completely dissolved in 30 parts of ethyl lactate with heating to 85° C. and stirring. Thereafter, the resulting solution was cooled to room temperature (25° C.), and then filtered by a heat and pressure filtering process with the use of a membrane filter having a pore diameter of 1.0 μm. Thus, a photosensitive varnish was prepared as the core layer formation material.

Example 2

A photosensitive varnish as a core layer formation material was prepared in substantially the same manner as in Example 1, except that the formulation of the resin component (aliphatic resin) included 50 parts of the solid polyfunctional aliphatic epoxy resin (EHPE 3150 available from Daicel Corporation) and 50 parts of a solid hydrogenated bisphenol-A epoxy resin (YX-8040 available from Mitsubishi Chemical Corporation) in the preparation of the photosensitive varnish as the core layer formation material.

Example 3

A photosensitive varnish as a core layer formation material was prepared in substantially the same manner as in Example 1, except that the formulation of the resin component (aliphatic resin) included 50 parts of the solid polyfunctional aliphatic epoxy resin (EHPE 3150 available from Daicel Corporation) and 50 parts of a liquid hydrogenated bisphenol-A epoxy resin (EP-4080E available from ADEKA Corporation) in the preparation of the photosensitive varnish as the core layer formation material.

Example 4

A photosensitive varnish as a core layer formation material was prepared in substantially the same manner as in Example 1, except that the formulation of the resin component (aliphatic resin) included 50 parts of the solid polyfunctional aliphatic epoxy resin (EHPE 3150 available from Daicel Corporation) and 50 parts of a liquid long-chain bifunctional aliphatic epoxy resin (EPOGOSE PT available from Yokkaichi Chemical Co., Ltd.) in the preparation of the photosensitive varnish as the core layer formation material.

Example 5

A photosensitive varnish as a core layer formation material was prepared in substantially the same manner as in Example 1, except that the formulation of the resin component (aliphatic resin) included 50 parts of the solid polyfunctional aliphatic epoxy resin (EHPE 3150 available from Daicel Corporation) and 50 parts of a liquid trifunctional aliphatic epoxy resin (DENACOL EX-321 available from Nagase ChemteX Corporation) in the preparation of the photosensitive varnish as the core layer formation material.

Example 6

A photosensitive varnish as a core layer formation material was prepared in substantially the same manner as in Example 1, except that the formulation of the resin component (aliphatic resin) included 50 parts of the solid polyfunctional aliphatic epoxy resin (EHPE 3150 available from Daicel Corporation) and 50 parts of a liquid bifunctional aliphatic oxetane resin (ARONOXETANE OXT-221 available from Toagosei Co., Ltd.) in the preparation of the photosensitive varnish as the core layer formation material.

Example 7

A photosensitive varnish as a core layer formation material was prepared in substantially the same manner as in Example 1, except that the formulation of the resin component (aliphatic resin) included 70 parts of the solid polyfunctional aliphatic epoxy resin (EHPE 3150 available from Daicel Corporation) and 30 parts of a liquid bifunctional alicyclic epoxy resin (CELLOXIDE 2021P available from Daicel Corporation) in the preparation of the photosensitive varnish as the core layer formation material.

Comparative Example 1

A photosensitive varnish as a core layer formation material was prepared in substantially the same manner as in Example 1, except that the formulation of the resin component (aliphatic resin) included 50 parts of the solid polyfunctional aliphatic epoxy resin (EHPE 3150 available from Daicel Corporation) and 50 parts of the liquid bifunctional alicyclic epoxy resin (CELLOXIDE 2021P available from Daicel Corporation) in the preparation of the photosensitive varnish as the core layer formation material.

Comparative Example 2

A photosensitive varnish as a core layer formation material was prepared in substantially the same manner as in Example 1, except that the formulation of the resin component (aliphatic resin) included 100 parts of the liquid bifunctional alicyclic epoxy resin (CELLOXIDE 2021P available from Daicel Corporation) and ethyl lactate (organic solvent) was not used in the preparation of the photosensitive varnish as the core layer formation material.

Comparative Example 3

A photosensitive varnish as a core layer formation material was prepared in substantially the same manner as in Example 1, except that the formulation of the resin component (aliphatic resin) included 100 parts of a liquid bifunctional alicyclic epoxy resin (CELLOXIDE 8000 available from Daicel Corporation) and ethyl lactate (organic solvent) was not used in the preparation of the photosensitive varnish as the core layer formation material.

Measurement and evaluation were performed on the photosensitive varnishes thus prepared as the core layer formation materials in the following manner for loss evaluation (evaluation for a material-specific loss). Together with the formulations of the core layer formation materials, the results are shown below in Tables 1 and 2. A varnish of a resin component was prepared for each of the core layer formation materials having the aforementioned formulations without addition of the photoacid generator and the antioxidant, and the absorbance of the varnish at 2960 $cm^{-1}$ was measured by the FT-IR ATR method and calculated in the following manner. The results are also shown below in Tables 1 and 2.

[Absorbance at 2960 $cm^{-1}$ by FT-IR ATR Method]

A varnish was prepared based on each of the aforementioned formulations of Examples and Comparative examples without addition of the photoacid generator and the antioxidant, and applied to a thickness of about 5 to about 10 μm on a silicon substrate (having a thickness of 500 μm) formed with an oxide film by a spin coating method. Then, the applied varnish was heated to be prebaked on a hot plate (at 130° C. for 5 minutes). Where the organic solvent was used, the organic solvent was dried off. Thus, an uncured thin film was formed (in a film shape). The absorbance of the film-shaped uncured thin film was measured at 2960 $cm^{-1}$ by the ATR method by means of an FT-IR (NICOLET IR-200 available from Thermo Electron Corporation), and evaluated. The absorbance at 2960 $cm^{-1}$ was calculated based on a base line defined in a spectral band between 3100 $cm^{-1}$ and 2600 $cm^{-1}$.

[Loss Evaluation (Material-Specific Loss)]

The photosensitive varnishes prepared in Examples and Comparative Examples described above were each applied to a thickness of about 5 to about 10 μm on a silicon substrate (having a thickness of 500 μm) formed with an oxide film by a spin coating method. In turn, the applied varnish was prebaked (at 130° C. for 5 minutes) on a hot plate, and then exposed to mixed radiation (broad light) at 5000 mJ (integrated at a wavelength of 365 nm), followed by a post heat treatment (performed stepwise at 80° C., 120° C. and 140° C. each for 5 minutes). Thus, a thin film was formed. Subsequently, light having a wavelength of 850 nm was inputted to the thin film by prism coupling, and transmitted through the thin film. Then, light intensities were measured for different transmission lengths by means of an optical measurement system (Optical Multipower Meter Q8221 available from Advantest Corporation). Optical losses were plotted with respect to the transmission lengths, and the resulting graph was approximated to a straight line. A material-specific loss (dB) for each of the photosensitive varnishes was calculated based on the gradient of the straight line, and evaluated based on the following criteria (a prism coupler method).

○ (acceptable): The material-specific loss was less than 0.02 dB/cm.

x (unacceptable): The material-specific loss was not less than 0.02 dB/cm.

TABLE 1

| | | Example (parts) | | | | | | |
|---|---|---|---|---|---|---|---|---|
| | | 1 | 2 | 3 | 4 | 5 | 6 | 7 |
| Resin component | EHPE 3150 | 100 | 50 | 50 | 50 | 50 | 50 | 70 |
| | YX-8040 | — | 50 | — | — | — | — | — |
| | EP-4080E | — | — | 50 | — | — | — | — |
| | EPOGOSE PT | — | — | — | 50 | — | — | — |
| | DENACOL EX-321 | — | — | — | — | 50 | — | — |
| | OXT-221 | — | — | — | — | — | 50 | — |
| | CELLOXIDE 2021P | — | — | — | — | — | — | 30 |
| | CELLOXIDE 8000 | — | — | — | — | — | — | — |
| Photoacid generator | WPI-116 | 1 | 1 | 1 | 1 | 1 | 1 | 1 |
| Antioxidant | Songnox 1010 | 0.5 | 0.5 | 0.5 | 0.5 | 0.5 | 0.5 | 0.5 |
| | HCA | 0.5 | 0.5 | 0.5 | 0.5 | 0.5 | 0.5 | 0.5 |
| Ethyl lactate (organic solvent) | | 30 | 30 | 30 | 30 | 30 | 30 | 30 |
| Absorbance at 2960 cm$^{-1}$ by FT-IR ATR method* | | 0.015 | 0.011 | 0.022 | 0.013 | 0.02 | 0.017 | 0.029 |
| Evaluation for loss at 850 nm (material-specific loss) | | ○ | ○ | ○ | ○ | ○ | ○ | ○ |

*Absorbance measured at 2960 cm$^{-1}$ for uncured thin film formed (in film shape) from varnish prepared by using resin component without addition of photoacid generator and antioxidant.

TABLE 2

| | | Comparative Example (parts) | | |
|---|---|---|---|---|
| | | 1 | 2 | 3 |
| Resin component | EHPE 3150 | 50 | — | — |
| | YX-8040 | — | — | — |
| | EP-4080E | — | — | — |
| | EPOGOSE PT | — | — | — |
| | DENACOL EX-321 | — | — | — |
| | OXT-221 | — | — | — |
| | CELLOXIDE 2021P | 50 | 100 | — |
| | CELLOXIDE 8000 | — | — | 100 |
| Photoacid generator | WPI-116 | 1 | 1 | 1 |
| Antioxidant | Songnox 1010 | 0.5 | 0.5 | 0.5 |
| | HCA | 0.5 | 0.5 | 0.5 |
| Ethyl lactate (organic solvent) | | 30 | — | — |
| Absorbance at 2960 cm$^{-1}$ by FT-IR ATR method* | | 0.032 | 0.049 | 0.068 |
| Evaluation for loss at 850 nm (material-specific loss) | | x | x | x |

*Absorbance measured at 2960 cm$^{-1}$ for uncured thin film formed (in film shape) from varnish prepared by using resin component without addition of photoacid generator and antioxidant.

As can be seen from the above results, the photosensitive varnishes (of Examples) each containing a resin component having an absorbance of less than 0.03 as measured at 2960 cm$^{-1}$ by the FT-IR ATR method each had a loss of less than 0.02 dB/cm, providing an excellent evaluation result in the evaluation for the loss (material-specific loss).

In contrast, the photosensitive varnishes (of Comparative Examples) each containing a resin component having an absorbance of greater than 0.03 as measured at 2960 cm$^{-1}$ by the FT-IR ATR method each provided a poorer evaluation result in the evaluation for the loss (material-specific loss).

[Production of Optical Waveguide]

Next, an optical waveguide was produced by using each of the photosensitive varnishes of Examples described above as a core layer formation material. Prior to the production of the optical waveguide, a photosensitive varnish for a cladding layer formation material was prepared.

<Preparation of Cladding Layer Formation Material>

Under shaded conditions, 50 parts of a liquid bifunctional fluoroalkyl epoxy resin (H022 available from Tosoh F-Tech, Inc.), 50 parts of a liquid bifunctional alicyclic epoxy resin (CELLOXIDE 2021P available from Daicel Corporation), 4.0 parts of a photoacid generator (ADEKAOPTOMER SP-170 available from ADEKA Corporation), 0.54 parts of a phosphorus antioxidant (HCA available from Sanko Co., Ltd.) and 1 part of a silane coupling agent (KBM-403 available from Shin-Etsu Silicones Co., Ltd.) were mixed together for complete dissolution with heating to 80° C. and stirring. Thereafter, the resulting solution was cooled to room temperature (25° C.), and then filtered by a heat and pressure filtering process with the use of a membrane filter having a pore diameter of 1.0 μm. Thus, the photosensitive varnish was prepared as the cladding layer formation material.

<Formation of Under-Cladding Layer>

The photosensitive varnish as the cladding layer formation material was applied onto a silicon wafer having a thickness of about 500 μm by means of a spin coater. Then, the applied varnish was exposed to mixed radiation (broad light) at 5000 mJ (integrated at a wavelength of 365 nm). In turn, the resulting varnish was subjected to a post heat treatment at 130° C. for 10 minutes. Thus, an under-cladding layer (having a thickness of 20 μm) was formed.

<Formation of Core Layer>

The photosensitive varnish (of Example 1) as the core layer formation material was applied onto the formed under-cladding layer with the use of a spin coater, and then dried (at 130° C. for 5 minutes) on a hot plate for removal of the organic solvent (ethyl lactate). Thus, an uncured layer was formed in an uncured film state. The formed uncured layer was subjected to mask pattern exposure (pattern width/pattern pitch (L/S)=50 μm/200 μm) by irradiation with mixed radiation (broad light) at 9000 mJ (integrated at a wavelength of 365 nm), and to a post heat treatment (at 140° C. for 5 minutes). Thereafter, the resulting layer was developed in N,N-dimethylacetamide (DMAc) (at 25° C. for 3 minutes), and rinsed with water. Then, the resulting layer was dried (at 120° C. for 5 minutes) on a hot plate for removal of water. Thus, a core layer (having a thickness of 55 μm) was formed as having a predetermined pattern.

Thus, the optical waveguide was produced, which had the under-cladding layer formed on the silicon wafer and the core layer formed in the predetermined pattern on the under-cladding layer. The optical waveguide thus produced was excellent without any problems in the production process.

While specific forms of the embodiment of the present invention have been shown in the aforementioned inventive examples, the inventive examples are merely illustrative of the invention but not limitative of the invention. It is contemplated that various modifications apparent to those skilled in the art could be made within the scope of the invention.

The inventive photosensitive resin composition for the optical waveguide is useful as a material for formation of a component of the optical waveguide, particularly, as a core layer formation material. The optical waveguide produced by using the optical waveguide photosensitive resin composition is used, for example, for a hybrid flexible printed wiring board for optical/electrical transmission.

What is claimed is:

1. An optical waveguide photosensitive resin composition comprising:
    a resin component; and
    a photopolymerization initiator;
    wherein the resin component has an absorbance of less than 0.03 as measured at 2960 cm$^{-1}$ by an attenuated total reflection measurement (ATR) method by means of a Fourier transform infrared spectrophotometer (FT-IR); and
    wherein the resin component comprises (i) a 1,2-epoxy-4-(2-oxiranyl)cyclohexane adduct of 2,2-bis(hydroxymethyl)-1-butanol alone or (ii) the 1,2-epoxy-4-(2-oxiranyl)cyclohexane adduct of 2,2-bis(hydroxymethyl)-1-butanol, which proportion is not less than 50 wt % based on the weight of the overall resin component, in combination with at least one selected from the group consisting of a solid hydrogenated bisphenol-A epoxy resin, a liquid hydrogenated bisphenol-A epoxy resin, a polytetramethylene glycol diglycidyl ether, a trimethylolpropane polyglycidyl ether and 3-ethyl-3{[(3-ethyloxetan-3-yl)methoxy]methyl}oxetane.

2. The optical waveguide photosensitive resin composition according to claim 1, wherein the photopolymerization initiator is a photoacid generator.

3. A photocurable film for formation of an optical waveguide core layer, the photocurable film being produced by forming the optical waveguide photosensitive resin composition according to claim 1 into a film shape.

4. An optical waveguide comprising:
    a substrate;
    a cladding layer provided on the substrate; and
    a core layer provided in a predetermined pattern in the cladding layer for transmission of an optical signal;
    wherein the core layer is formed by curing the optical waveguide core layer formation photocurable film according to claim 3.

5. A hybrid flexible printed wiring board for optical/electrical transmission, comprising the optical waveguide according to claim 4.

6. The optical waveguide according to claim 4, wherein the resin component has an absorbance of not greater than 0.02 as measured at 2960 cm$^{-1}$ by an attenuated total reflection measurement (ATR) method by means of a Fourier transform infrared spectrophotometer (FT-IR).

7. The optical waveguide according to claim 4, wherein the resin component has an absorbance of not greater than 0.015 as measured at 2960 cm$^{-1}$ by an attenuated total reflection measurement (ATR) method by means of a Fourier transform infrared spectrophotometer (FT-IR).

8. An optical waveguide comprising:
    a substrate;
    a cladding layer provided on the substrate; and
    a core layer provided in a predetermined pattern in the cladding layer for transmission of an optical signal;
    wherein the core layer is formed by curing the optical waveguide photosensitive resin composition according to claim 1.

9. A hybrid flexible printed wiring board for optical/electrical transmission, comprising the optical waveguide according to claim 8.

10. The optical waveguide according to claim 8, wherein the resin component has an absorbance of not greater than 0.02 as measured at 2960 cm$^{-1}$ by an attenuated total reflection measurement (ATR) method by means of a Fourier transform infrared spectrophotometer (FT-IR).

11. The optical waveguide according to claim 8, wherein the resin component has an absorbance of not greater than 0.015 as measured at 2960 cm$^{-1}$ by an attenuated total reflection measurement (ATR) method by means of a Fourier transform infrared spectrophotometer (FT-IR).

12. The optical waveguide photosensitive resin composition according to claim 1, wherein the resin component has an absorbance of not greater than 0.02 as measured at 2960 cm$^{-1}$ by an attenuated total reflection measurement (ATR) method by means of a Fourier transform infrared spectrophotometer (FT-IR).

13. The optical waveguide photosensitive resin composition according to claim 1, wherein the resin component has an absorbance of not greater than 0.015 as measured at 2960 cm$^{-1}$ by an attenuated total reflection measurement (ATR) method by means of a Fourier transform infrared spectrophotometer (FT-IR).

* * * * *